United States Patent Office 3,799,950
Patented Mar. 26, 1974

3,799,950
PROCESS FOR THE MANUFACTURE OF POLYGLYCIDYL ETHERS
Werner Margotte, Birsfelden, and Alfred Renner, Muenchenstein, Switzerland, assignors to Ciba-Geigy Corporation
No Drawing. Continuation of abandoned application Ser. No. 881,629, Dec. 2, 1969. This application Apr. 19, 1972, Ser. No. 245,632
Claims priority, application Switzerland, Dec. 6, 1968, 18,312/68
Int. Cl. C07d 1/18
U.S. Cl. 260—348.6
3 Claims

ABSTRACT OF THE DISCLOSURE

Process for the manufacture of polyglycidyl ethers by condensation of aliphatic or cycloaliphatic polyhydroxy compounds which have a melting point of at least 80° C., for example pentaerythritol, dipentaerythritol, sorbitol, 2,2-bis-(p-hydroxycyclohexyl)-propane or 1,12-dihydroxy-dodecane, with an epihalogenohydrin or β-methylepihalogenohydrin, for example epichlohydrin, in a first stage in the presence of a solvent which consists of 100–30 percent by weight of 1,4-dioxan and 0–70 percent by weight of another organic solvent which has a boiling point of at least 70° C. and is not reactive towards an epihalogenohydrin, to give the corresponding chlorhydrin ethers and, in a second stage, with agents which split off hydrogen halide, to give the corresponding polyglycidyl ethers.

---

This is a continuation of Ser. No. 881,629, filed Dec. 2, 1969 and now abandoned.

At the present time a single-stage process and a two-stage process are known for the manufacture of aliphatic glycidyl ethers. The single-stage process, which is for example the subject of the French patent specification No. 1,097,112, is characterized in that epichlohydrin—preferably in excess—is added to the hydroxy compounds, and hydrogen chloride split off, in the presence of strong alkali. In the two-stage process epichlorhydrin is, in the first stage, catalytically added to the hydroxy compound in the presence of a Lewis acid such as boron trifluoride, tin tetrachloride or p-toluenesulphonic acid. In the course thereof the addition of epichlorhydrin to halohydrin ethers which have already been formed, in accordance with the reaction equation

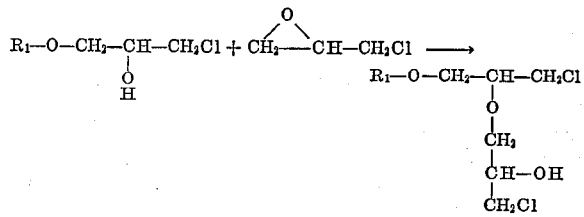

wherein $R_1$ represents an aliphatic or cycloaliphatic residue, manifests itself to a major extent as a side-reaction. Hydrogen chloride is again split off with the aid of strong alkalis such as sodium hydroxide, sodium aluminate, sodium zincate or sodium metasilicate. Such a process is for example described in U.S. patent specification 2,581,464.

These processes yield satisfactory results in the manufacture of glycidyl ethers of aliphatic alcohols, of simple glycols or of glycerine. They are therefore also used on an industrial scale. These processes are less well suited to the manufacture of the glycidyl compound of polyhydric hydroxy compounds which are solid at room temperature. Increasing difficulties manifest themselves with increasing hydroxyl equivalence and increasing melting point. Whilst the first-mentioned process only gives very poor yields of polyglycidyl ether, dark, highly viscous products of low epoxide content, contaminated with polyepichlorhydrin, are obtained in the two-stage process. The danger of premature gelling is great. In order to counter this, U.S. patent specification 2,581,464 recommends the use of expensive dehydrohalogenating agents, such as finely divided sodium aluminate and the like. A typical representative of high melting polyhydroxy compounds in which the processes belonging to the state of the art fail is pentaerythritol. The last-mentioned patent specification therefore recommends using glycol or glycerin as the solvent for the pentaerythritol. After the reaction with epichlorhydrin and after the splitting off of hydrogen halide, complex resinous mixtures of the glycidyl compounds of both components are therefore obtained, the separation of which is evidently coupled with great difficulties and costs. The glycidylation of sorbitol also only succeeds very unsatisfactorily; the resulting reaction product shows only 40% of the theoretical epoxide group content. Further compounds or classes of compounds of which the glycidylation does not succeed, or only succeeds unsatisfactorily, with the currently known processes are dipentaerythritol, mannitol, monosaccharides, oligosaccharides and polysaccharides, higher-melting cycloaliphatic polyalcohols, such as the 2,2-bis(p-hydroxycyclohexyl)-propane which is easily accessible by hydrogenation of bis-phenol A, and the straight-chain α,ω-glycols having more than 10 carbon atoms.

It has surprisingly been found that all the difficulties mentioned can be avoided and that the above-mentioned polyhydroxy compounds can be converted with high yields into polyglycidyl ethers if the addition of an epihalogenohydrin, preferably of epichlorhydrin, is carried out in the presence of 1,4-dioxan. This in no way presupposes that the polyhydroxy compound to be reacted has to be completely dissolved in 1,4-dioxan at the start of the reaction. The reaction-promoting effect of the 1,4-dioxan also manifests itself in a heterogeneous system and is therefore all the more astonishing. It should be noted at this point that 1,4-dioxan has already been proposed as a solvent or diluent in the splitting off of hydrogen chloride. This measure can undoubtedly be combined with the addition of epichlorhydrin in the presence of 1,4-dioxan according to the invention, but is not claimed within the framework of the present invention. Rather, questions of process technology and of economics would lead to the dioxan being removed before the splitting off of hydrogen chloride. This is so for the following reason: The catalysts ($BF_3$, $SnCl_4$ and the like) which accelerate the addition of epichlorhydrin are inactivated or even decomposed by water. The homogeneous or heterogeneous system polyhydroxy compound/epichlorhydrin/catalyst/1,4-dioxan must therefore be anhydrous. If now hydrogen chloride is conventionally split off with sodium hydroxide in the second reaction stage, one mol of water forms per mol of NaOH. In most cases the sodium hydroxide is added as an aqueous solution. The 1,4-dioxan thus becomes diluted with water; however, as stated, anhydrous 1,4-dioxan is required for the first reaction stage. If therefore one wishes to re-use the 1,4-dioxan distilled off after the second reaction stage for the first reaction stage, it has first to be dehydrated. Separation of water and 1,4-dioxan by distillation cannot be carried out in an economically tolerable manner because of the boiling point difference of only 1.5° C. It is therefore expedient to distil off the 1,4-dioxan which is still anhydrous after the first reaction stage and to carry out the second stage, if necessary, in a different solvent which is only slightly miscible with water such as toluene, xylene, butanol or methyl isobutyl ketone.

Instead of pure dioxan it is also possible to use a solvent mixture of at least 30 percent by weight of dioxan and another organic solvent having a boiling point of at least 70° C., which is not reactive towards epichlorhydrin, in the first stage. Suitable organic solvents which can be employed in combination with dioxan but in an amount not exceeding 70 percent by weight of the solvent mixture, are for example heptane, octane, 1,2-dichlorethane, 1,2,2-trichlorethylene, benzene, toluene, xylene, chlorobenzene, methyl ethyl ketone, ethyl acetate and butyl acetate. The yields become somewhat worse through the conjoint use of such other solvents but the results are still better than in the manufacturing processes hitherto known.

The subject of the invention is therefore a process for the manufacture of polyglycidyl ethers by condensation of aliphatic or cycloaliphatic polyhydroxy compounds with an epihalogenohydrin in the presence of Lewis acids as catalysts, characterized in that aliphatic or cycloaliphatic polyhydroxy compounds which have a melting point of at least 80° C. are, in a first stage, converted into the corresponding chlorhydrin ethers by reaction with an epihalogenohydrin of formula

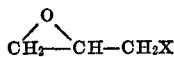

wherein X denotes a chlorine or bromine atom, in the presence of a solvent which consists of 100-30 percent by weight of 1,4-dioxan and of 0-70 percent by weight of another organic solvent which has a boiling point of at least 70° C. and is not reactive towards epihalogenohydrin, and that in the second stage the halohydrin ether groups are dehydrohalogenated with agents which split off hydrogen halide, in a manner which is in itself known, to give glycidyl ether groups.

A preferred embodiment of the process consists of recovering the 1,4-dioxan in an anhydrous form by distilling off after the first reaction stage and carrying out the dehydrohalogenation with alkali in the presence of a solvent which is only slightly miscible with water.

In some cases it is of advantage to remove the water supplied and produced during the dehydrohalogenation by azeotropic distillation during the reaction. Epichlorhydrin and epibromhydrin are particularly suitable as the epihalogenohydrin.

As compounds having at least 2 aliphatic or cycloaliphatic hydroxyl groups and a melting point of above 80° C. there may be mentioned: pentaerythritol and its oligomers such as dipentaerythritol, and also arabitol, sorbitol, mannitol and dulcitol, pentoses, such as arabinose, xylose or ribose, hexoses, such as glucose, fructose, mannose or galactose, oligosaccharides, such as maltose, saccharose, lactose and raffinose, polysaccharides, such as starch and cellulose, cyclic polyalcohols, such as quinitol, quercitol, inositol and 2,2' - bis - (p-hydroxycyclohexyl)-propane; straight-chain $\alpha,\omega$-glycol having more than 10 C-atoms such as 1,12 - dodecanediol or 1,18 - octadecanediol; 4,4' - di - ($\beta$ - hydroxyethoxy) - diphenylsulphone and also the corresponding stereoisomers and the racemic mixtures, provided they melt at above 80° C.

Suitable catalysts for the addition of an epihalogenohydrin to the abovementioned polyhydroxy compounds are especially Lewis acids, such as for example $AlCl_3$, $SbCl_5$, $SnCl_4$, $FeCl_3$, $ZnCl_2$, $BF_3$ and their complexes with organic compounds, as well as p-toluenesulphonic acid.

Suitable agents which split off hydrogen halide, for the second process stage, are strong alkalis, for example anhydrous sodium hydroxide or aqueous sodium hydroxide solution. However sodium aluminate, sodium silicate or sodium zincate can also be used.

As examples of solvents for the second process stage which show limited miscibility with water there may be mentioned: benzene, toluene, xylene, butanol, methyl isobutyl ketone and cyclohexanone.

The polyglycidyl ethers obtained according to the process of the invention are mostly mixtures of different glycidyl compounds. They contain unreacted hydroxyl groups to a greater extent especially if epichlorhydrin has been used in less than equivalent amounts. Since—as already mentioned—the hydroxyl group of the chlorhydrin ether is capable of further addition of epichlorhydrin, chlorine-containing polyethers are also in part produced, and the chlorine atoms of these cannot be split off under the process conditions. For this reason the process products always contain a few percent of chlorine.

The polyglycidyl ethers manufactured according to the process of the invention are, in addition to the industrial end uses which are customary for epoxide resins, especially suitable for surface protection. In suitable formulations they yield lacquer films of high gloss and coatings of extraordinary solvent resistance, and are furthermore suitable for use as organic binders in building materials, for example for increasing the strength of concrete and rendering it hydrophobic.

In the examples which follow parts denote parts by weight and percentages denote percentages by weight unless otherwise stated. The relationship of parts by volume to parts by weight is as of the milliliter to the gram.

EXAMPLE 1

A mixture of 3.4 parts of finely ground pentaerythritol and 10 parts of 1,4-dioxan is heated whilst stirring and condensing under reflux. After adding 0.23 part of tin tetrachloride, 12.95 parts of epichlorhydrin are added dropwise whilst stirring and boiling under reflux. The molar ratio of pentaerythritol to epichlorhydrin is 0.025: 0.14. The pentaerythritol has dissolved in the course of the reaction, and the mixture is cooled to 50° C. After reducing the pressure to 60 mm. Hg, the 1,4-dioxan is distilled off. Thereafter no further epoxide can be detected. 22 parts of toluene are added and the mixture distilled at 55–60° C. and 100 mm. Hg through a water separator, whilst 12 parts of 50% strength aqueous sodium hydroxide solution are added dropwise. In total 7.1 parts of water are separated off. The azeotropic distillation is completed, 15 parts of water are added, the mixture is well stirred and the phases are separated. The toluene solution is washed with 4 parts of 50% strength aqueous $NaH_2PO_4$ solution, again separated off and dried over 2 parts of anhydrous sodium sulphate. After filtration, the toluene is distilled off at 15 mm. Hg until an internal temperature of 135° C. is reached. 10.9 parts (85.9% of theory) of a yellow liquid with the following characteristics are obtained:

Epoxide content: 7.15 equivalents/kg. (90.9% of theory)
Chlorine content: 10.45%
Viscosity (25° C.): 460 cp.
Color number according to Gardner/Holdt: 7

If in the above Example 1 a mixture of equal parts of 1,4-dioxan and toluene (weight ratio 1:1) is used as a solvent instead of pure 1,4-dioxan, a glycidyl ether having an epoxide content of 6.78 epoxide equivalents/ kg. (86.1% of theory) is obtained in a quantity yield of 77.2% of theory.

EXAMPLE 2

7.53 parts of dipentaerythritol are suspended in 30 parts by volume of 1,4-dioxan. The mixture is heated to boiling whilst stirring. After adding 0.7 part of tin tetrachloride, 18.5 parts of epichlorhydrin are added dropwise. The molar ratio of dipentaerythritol to epichlorhydrin is 0.0297:0.2. The mixture is allowed to boil under reflux overnight and thereafter the 1,4-dioxan is distilled off under a partial vacuum. Thereafter no further epoxide can be detected.

The residue is dissolved in a mixture of equal parts of butanol and toluene and is dehydrohalogenated with 22.8 parts of 35% strength aqueous sodium hydroxide solution at −4° C. with good external cooling. The product is washed with 30 parts of water, dehydrated by azeotropic distillation at about 50° C., clarified through "Hyflo-Super-Cel" (registered trade name of a commercial product of Johns-Manville International Corporation for prepared and standardized kieselguhr), and the solvent distilled off at 15 mm. Hg until the internal temperature is 150° C. A pale yellow resin of low viscosity remains as the residue.

Yield: 18 parts (92.3% of theory)
Epoxide content: 6 equivalents/kg. (65.8% of theory)
Viscosity (25° C.): 600 cp.
Color number according to Gardner/Holdt: 4

EXAMPLE 3

18.2 parts of sorbitol are suspended in 60 parts by volume of 1,4-dioxan and heated to boiling. After adding 0.25 part by volume of boron trifluoride-diethyl etherate, 27.8 parts of epichlorhydrin are added whilst stirring and cooling under reflux. The molar ratio of sorbitol to epichlorhydrin is 0.1:0.3. An exothermic reaction occurs and the sorbitol gradually dissolves. After the end of the dropwise addition the mixture is boiled for a further 100 minutes under reflux; thereafter no further epoxide can be detected.

(a) Dehydrochlorination with sodium hydroxide solution.—Half the above reaction mixture is freed of 1,4-dioxan at 65 mm. Hg and 70° C. The residue is dissolved in 30 parts of toluene and is dehydrohalogenated at 50–55° C. and 60–80 mm. Hg with 15.0 parts of 50% strength aqueous sodium hydroxide solution. The sodium chloride formed is filtered off and well rinsed with toluene, and the toluene is removed in vacuo. 17.2 parts (98.3% of theory) of a light yellow resin having an epoxide content of 5.8 equivalents/kg. (67.7% of theory) are obtained.

(b) Dehydrochlorination with sodium aluminate.—The second half of the dioxan solution is heated for 8.75 hours to 95° C. with 20 parts of sodium aluminate ($Al_2O_3$ content=51%) whilst stirring. The mixture is cooled to room temperature and filtered, the residue rinsed with a further 30 parts of 1,4-dioxan, and the filtrate concentrated at 100° C./15 mm. Hg. 5.45 g. (31.2% of theory) of a light yellow resin with an epoxide content of 4.7 equivalents/kg. (54.8% of theory) are obtained.

EXAMPLE 4

708 parts of 2,2-bis-(p-hydroxycyclohexyl)-propane are dissolved in 2000 parts by volume of 1,4-dioxan at the boil. 2.3 parts of tin tetrachloride are added and 555 parts of epichlorhydrin are added dropwise at 90° C. whilst stirring. The molar ratio of 2,2-bis-(p-hydrocyclohexyl)-propane to epichlorhydrin is 2.95:6. The mixture is allowed to continue to react for 2 hours at this temperature, with 2.3 parts of $SnCl_4$ being added 3 times in order to keep the reaction going. Thereafter no further epoxide can be detected. 300 parts of finely powdered sodium hydroxide are scattered in at 30° C. with good external cooling. The mixture is allowed to continue to react for 3 hours and the solids are then filtered off and rinsed twice with 250 parts by volume of 1,4-dioxan. The filtrates are combined and the 1,4-dioxan is distilled off in vacuo up to an internal temperature of 80° C. 951 parts (90.7% of theory) of the diglycidyl ether, having the following characteristics, are obtained:

Epoxide content: 4.8 equivalents/kg. (85.3% of theory)
Chlorine content: 2.9%
Viscosity (25° C.): 1400 cp.
Color number (Gardner/Holdt): 5

EXAMPLE 5

606 parts of 1,12 - dihydroxydodecane (melting point=81° C.), 4.64 parts of $SnCl_4$ and 1000 parts by volume of 1,4-dioxan are heated to the boil. 583 parts of epichlorhydrin are added dropwise at 100° C. The molar ratio of 1,12-dihydroxydodecane to epichlorhydrin is 3:6.3. 40 minutes after the end of the dropwise addition the epoxide content of the reaction mixture has fallen to 0.06 equivalent/kg. The product is dehydrohalogenated with 300 parts of finely powdered sodium hydroxide and worked up in accordance with Example 4. 970 parts of a white, waxy, crystalline mass (100% of theory) are obtained, having a melting point of 35° C. The epoxide group content is 5.52 equivalents per kg. (89.2% of theory); the chlorine content is 3.4%.

We claim:

1. In a process for the manufacture of polyglycidyl ethers of pentaerythritol and dipentaerythritol by the condensation of said compounds with an epihalogenohydrin in the presence of a Lewis acid as a catalyst and thereafter dehydrohalogenating the condensation product to obtain the polyglycidyl ether, the improvement which comprises conducting the condensation in the presence of a solvent consisting essentially of 1,4-dioxane.

2. A process according to claim 1, characterized in that epichlorhydrin is used as the epihalogenohydrin.

3. A process according to claim 1 in which the 1,4-dioxan is separated from the condensation product prior to dehydrohalogenation.

References Cited

UNITED STATES PATENTS

| | | | |
|---|---|---|---|
| 3,298,981 | 1/1967 | Fry et al. | 260—348.6 |
| 3,466,305 | 9/1969 | Davis et al. | 260—348 |

FOREIGN PATENTS

| | | | |
|---|---|---|---|
| 488,698 | 12/1952 | Canada | 260—348.6 |

NORMA S. MILESTONE, Primary Examiner

U.S. Cl. X.R.

260—209 R

UNITED STATES PATENT OFFICE
CERTIFICATE OF CORRECTION

Patent No. 3,799,950      Dated March 26, 1974

Inventor(s) Werner Margotte and Alfred Renner

It is certified that error appears in the above-identified patent and that said Letters Patent are hereby corrected as shown below:

Column 1, in the heading, line 5, change "assignors to CIBA-GEIGY CORPORATION" to ---assignors CIBA-GEIGY AG---.

Signed and sealed this 22nd day of October 1974.

(SEAL)
Attest:

McCOY M. GIBSON JR.          C. MARSHALL DANN
Attesting Officer             Commissioner of Patents